April 22, 1969 M. Z. WOSKOW ETAL 3,440,299
DEHYDROGENATION PROCESS USING MAGNESIUM FERRITE
Filed Jan. 27, 1967
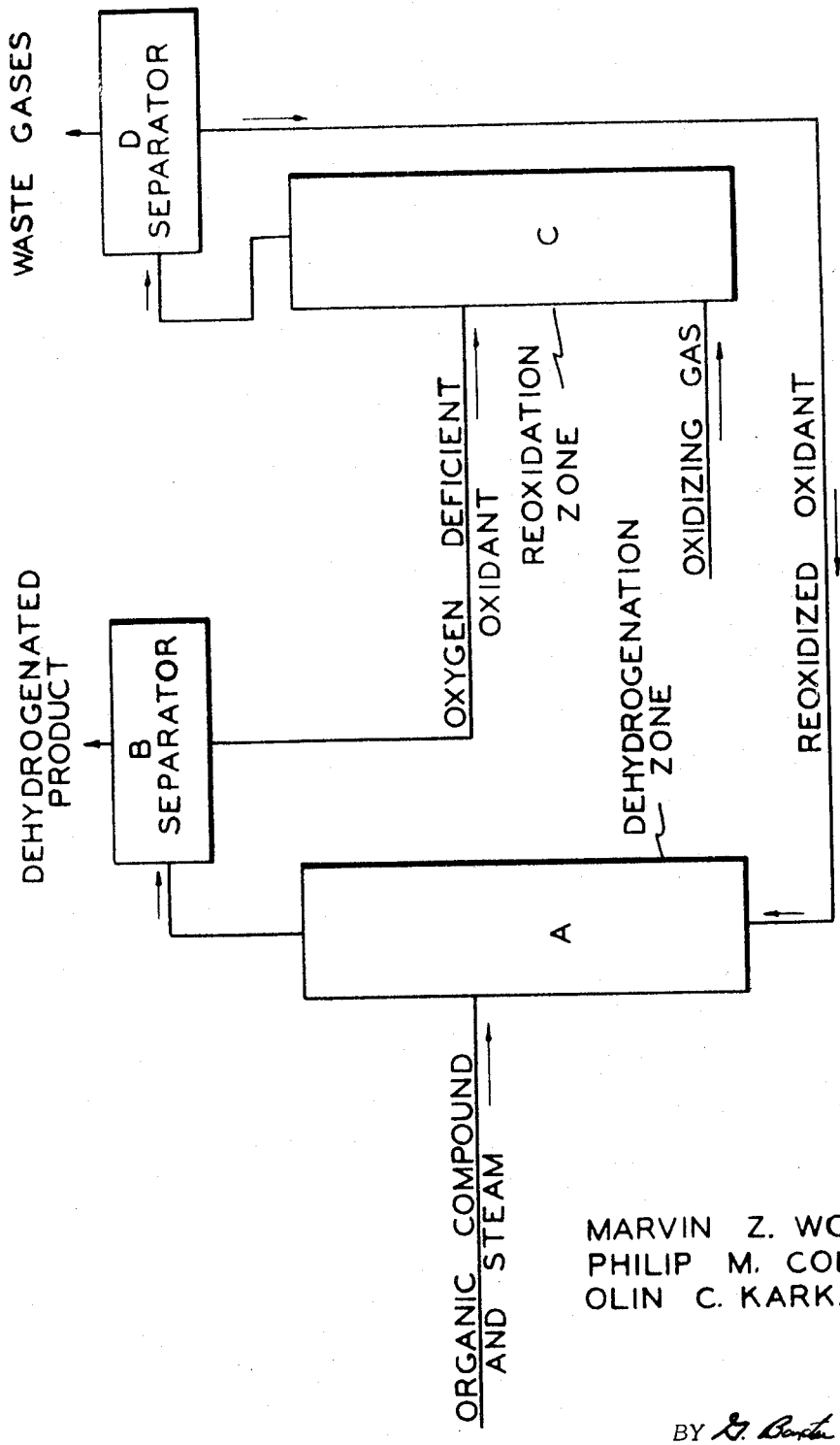
MARVIN Z. WOSKOW
PHILIP M. COLLING
OLIN C. KARKALITS, JR.
*INVENTORS*
BY *G. Baxter Dunaway*
*ATTORNEY*

United States Patent Office 3,440,299
Patented Apr. 22, 1969

3,440,299
DEHYDROGENATION PROCESS USING MAGNESIUM FERRITE
Marvin Z. Woskow, Philip M. Colling, and Olin C. Karkalits, Jr., Houston, Tex., assignors to Petro-Tex Chemical Corporation, Houston, Tex., a corporation of Delaware
Filed Jan. 27, 1967, Ser. No. 612,205
Int. Cl. C07c 5/18, 11/22, 15/10
U.S. Cl. 260—680    23 Claims

ABSTRACT OF THE DISCLOSURE

Dehydrogenation of organic compounds by reacting hydrogen removed from the organic compound with oxygen to form water. Oxygen is supplied by solid oxidant comprising magnesium ferrite which releases oxygen and is thereby converted to a composition diminished in oxygen.

BACKGROUND OF THE INVENTION

Field of the invention

This application relates to the dehydrogenation of organic compounds utilizing oxygen released from an oxidant. The invention is particularly suitable for the dehydrogenation of organic compounds such as paraffins, olefins, cycloaliphatics, alkyl aromatic compounds and so forth. Preferred products are such as olefins or diolefins and mixtures thereof.

Description of the prior art

Organic compounds are commercially dehydrogenated by contacting the compound to be dehydrogenated at an elevated temperature preferably in the presence of catalysts. However, according to many of these prior art processes, the products are obtained at relatively low levels of conversion and selectivity. It is also known to dehydrogenate organic compounds by reacting hydrogen split off from the organic compound with oxygen to form water. One of the principal objections to this type of reaction is that quite often the reaction is unselective and oxygenated compounds are formed instead of the desired dehydrogenated compounds. Attempts have been made to minimize the oxidation of the organic compounds by supplying the oxygen in the form of an oxidant. The oxidant may be such as a metal oxide. At the elevated temperature of reaction and in the presence of the compound to be dehydrogenated, the oxidant releases oxygen which reacts with hydrogen split off from the organic compound. The oxidant is then in a depleted state of oxidation and must be reoxidized in order to further react with the organic compound to be dehydrogenated. Examples of this type of reaction may be found in A. S. Ramage, Can. Chem. J. 2, pages 192–5 (1918), U.S. Patent 3,118,007, Jan. 14, 1964, U.S. Patent 3,050,572, Aug. 21, 1962, U.S. Patent 2,978,522, Apr. 4, 1961 and French Patent 915,501. However, a superior process is desired. One of the principal objectives of this invention is to provide a process wherein the oxidant has a long life and produces dehydrogenated product at a high level of conversion and selectivity. Other objectives of this process are to provide a process which has an oxidant that is compatible with substantial quantities of steam, a low load on the purification and recovery system, a high overall throughput and low contact time in the dehydrogenation zone, a tolerance for organic impurities in the feed, a simplified dehydrogenation zone, an oxidant and process conditions wherein the oxidant is not easily disintegrated, a low overall requirement for steam, a low maximum temperature during dehydrogenation and an oxidant which is useful for the dehydrogenation of more than one type of organic compound. Still other objectives are to provide a process which can require little or no stripping of reaction gases in the reoxidation zone and a process which has excellent control of reaction temperature.

The choice of oxidant and the method in which it is employed is critical in such a process. The complexity involved in the selection of the oxidant may be comprehended to some extent when the requirements of the oxidant are realized. For selective reaction to take place, the oxidant must release exactly the right quantity of oxygen in the dehydrogenation zone within the proper period of time. If excess oxygen is released, the nonselective oxidation reactions result, whereas if insufficient oxygen is released, the degree of dehydrogenation is retarded. Furthermore, the oxidant must be capable of being repeatedly regenerated quickly and cleanly. Little or no coke formation is desirable. A further objective is that after the oxidant has been used, it should be easily stripped of the adsorbed gases. A most important requirement of the oxidant is that it must exhibit long life, and the ability to achieve selective dehydrogenation and regeneration in sequence must diminish little with time. The exact nature of the acquisition and release of oxygen by the oxidant is not fully understood. Undoubtedly, both physical and chemical phenomena are involved. For example, the oxygen may be both physically adsorbed and chemically reacted to form a compound of a higher state of oxidation. These and other objects of this invention are accomplished according to the process of this invention.

SUMMARY OF THE INVENTION

According to this invention organic compounds are dehydrogenated by an improved process wherein hydrogen from the organic compound is reacted with oxygen supplied by an oxidant. The oxidant is thereafter reoxidized and again used for the purpose of supplying oxygen to the dehydrogenation zone. According to this invention, the oxidant comprises magnesium ferrite. An embodiment of the invention is the process wherein the oxidant contains both magnesium ferrite and iron oxide. A preferred feature of this invention is that the oxidant is formed by having iron which is present as iron oxide in the final oxidant present during the formation of the ferrite. Another preferred feature of this invention is in the use of certain reaction conditions and steps including a short contact time. An additional feature is in the use of certain quantities of steam in the dehydrogenation zone. Other objects are set forth above.

BRIEF DESCRIPTION OF THE DRAWING

One preferred method of conducting the process of this invention is illustrated in the drawing. The zones are used to illustrate steps of the process. In the dehydrogenation zone A the organic compound to be dehydrogenated is contacted with the oxidant at an elevated temperature. A preferred embodiment is that steam may be also introduced in zone A. The oxidant may suitably be in the form of a moving fluidized bed. The oxidant may then be conducted to the separator B where the oxidant is separated from the dehydrogenated product. The oxidant may then be conducted to reoxidation zone C where the oxidant is reoxidized by an oxidizing gas. The oxidizing gas serves to replenish the oxygen lost during the dehydrogenation in zone A. The reoxidized oxidant may be transmitted to zone D wherein the waste gases are removed. These waste gases may include such gases as nitrogen and combustion products. The oxidant which has been reoxidized and stripped of waste gases may then be recycled to the dehydrogenation zone A to again supply the required quantity of oxygen in the dehydrogenation zone A.

DESCRIPTION OF THE PREFERRED EMBODIMENT(S)

According to this invention a process is provided for the dehydrogenation of organic compounds which comprises (1) contacting in a dehydrogenation step the said organic compound in gaseous form with an oxidant at an elevated temperature with the said oxidant supplying oxygen in the dehydrogenation step to react with hydrogen from the said organic compound and thereby produce dehydrogenated organic compound and oxidant which is diminished in oxygen, (2) separating the dehydrogenated organic compound from the oxidant which is diminished in oxygen, (3) reoxidizing the oxidant and (4) contacting organic compound to be dehydrogenated with the reoxidized oxidant. The oxidant comprises magnesium ferrite. Excellent results have been obtained when the oxidant has in the surface at least 65 or preferably at least 80 atomic weight percent of the magnesium as magnesium ferrite. Also excellent results have been obtained when the oxidant has in the surface from 10 to 98 atomic weight percent of the iron present as magnesium ferrite and from 90 to 2 atomic weight percent of the iron being present as iron oxide, with a preferred range being from 40 to 95 atomic weight percent as magnesium ferrite and 60 to 5 percent present as iron oxide. The magnesium in the oxidant surface generally will be present in an amount of from or about 3 to 30 weight percent, with a preferred percent being from or about 4 to 20 weight percent magnesium, based on the total weight of the iron and magnesium in the oxidant surface.

The process of this invention is a process wherein the oxidant selectively releases the required critical quantity of oxygen in a first step, and the oxidant is regenerated with oxygen in a second step. The regenerated oxidant may then be employed to further contact organic compound as in the first step. Although any method which accomplished these results may be employed, certain methods are preferred. A preferred process is where the oxidant is in a dilute phase fluidized state as a moving bed and that two separate zones are utilized for dehydrogenation and for reoxidation. By such a procedure the process can be operated continuously. The dehydrogenation zone may be one vessel and the reoxidation zone a separate vessel, or the reoxidation zone and the dehydrogenation zone may be a continuation of each other, as the oxidant may be circulated in a loop with the oxygen being added at one point which is the beginning of the reoxidation zone and the organic compound to be dehydrogenated is added at a later point which becomes the dehydrogenation zone. A preferred mode of operating the invention is illustrated in the drawing wherein separate dehydrogenation and reoxidation zones are employed. However, the zones B and D may be combined with or may be continuations of the respective zones A and C. Stripping gases may be used in zone C, with steam being advantageously employed. Other stripping gases can be substantially inert gases such as nitrogen. However, it is an advantage of the use of the oxidant of this invention that little or no stripping is required in zone C. For example, steam if employed may be used in an amount of less than 5 mols per mol of organic compound to be dehydrogenated fed to the dehydrogenation zone, with a suitable range being from 0 or .5 to 4 mols of steam per mol of organic compound.

Halogen may be present during dehydrogenation to give excellent results. The presence of halogen is particularly effective when a saturated hydrocarbon is dehydrogenated. The halogen present during dehydrogenation may be either elemental halogen or any compound of halogen which would liberate halogen under the conditions of reaction. Suitable sources of halogen are such as metal or metalloid halides, hydrogen iodide, hydrogen bromide and hydrogen chloride; aliphatic or cycloaliphatic halides, such as methyl bromide and 1,2-dibromo ethane, cycloaliphatic halides, such as cyclohexylbromide; aromatic halides, such as benzyl bromide; ammonium iodide; ammonium bromide; ammonium chloride; organic amine halide salts, such as methyl amine hydrobromide; and the like. The source of the halogen may be the oxidant or an additive to the oxidant. Mixtures of various sources of halogen may be used. If present, the total halogen can be present in the vapor phase during dehydrogenation in amounts such as from 0.0001 or less to 0.5 or more mols of halogen (calculated as mols of halogen) per mol of compound to be dehydrogenated. Oxygen or oxygen mixed with other gases may also be added during dehydrogenation but this is not necessary and the predominant source of oxygen should be from the oxidant with a preferred situation being that where at least 90 mol percent of the oxygen is supplied by the oxidant.

The oxidant comprises magnesium ferrite. According to this invention, it has been discovered that excellent results have been obtained when the iron in the oxidant is not essentially completely in the form of magnesium ferrite. An oxidant having a portion of the iron in the form of iron oxide may be formed by preforming the magnesium ferrite and mixing the magnesium ferrite with iron oxide. However, we have discovered that superior results are obtained when iron present as iron oxide in the oxidant is either predominately present initially during the formation of the ferrite portion of the oxidant or is predominately formed in situ during the formation of the ferrite or a combination thereof. Thus, according to this mode of the invention, the iron which is present as iron oxide in the oxidant is predominately present during the formation of the ferrite. For example, either iron oxide or a precursor of iron oxide can be combined, such as by intimate mixing, with the compounds which are the precursors of the ferrite. If iron which is combined with oxygen in the final oxidant is present initially as iron oxide, then the iron oxide may or may not be transformed during the ferrite formation. On the other hand, a precursor of iron oxide such as iron oxalate may be decomposed during the formation of the ferrite to form iron oxide in the final oxidant. Another process wherein the iron of the iron oxide precursor is present during formation of magnesium ferrite is where an excess of magnesium ferrite is formed and iron oxide is then formed by reducing the magnesium ferrite with a gas such as hydrogen. Nevertheless, even if iron oxide of the oxidant was also initially present as iron oxide, this is not to say that there is no physical or chemical transformation of this initially present iron oxide during the ferrite formation. Any interactions taking place between the initially present iron oxide and the precursors of the ferrite are not fully understood, but superior oxidants may be produced by the procedure. It is possible that the iron oxide or a precursor thereof becomes linked in a crystalline manner with the magnesium ferrite which is formed or it is also possible that the iron oxide may be present in the final oxidant as a solution in the magnesium ferrite (or vice versa). The oxidant as used in the dehydrogenation step in this invention will preferably have the iron oxide portion of the oxidant predominantly present as gamma iron oxide. This gamma iron oxide may be obtained by forming an oxidant with the iron oxide portion in the form of alpha iron oxide which is thereafter converted to predominantly gamma iron oxide by any suitable means. Nevertheless, it is not essential that the iron oxide first go through the alpha form.

The oxidant as it is being used to supply oxygen in the dehydrogenation zone should preferably have the iron with a valence of predominantly plus three. Also, the ferrite portion of the oxidant should preferably have essentially the formula $MeFe_2O_4$ with Me representing magnesium. It has also been discovered that there are certain other characteristics of these preferred oxidants, some of which are discussed below. The surface of the oxidant will preferably have a crystalline structure in which the components have a cubic face-centered configuration as the crystalline structure.

According to this invention it has been found that the preferred oxidants exhibit a certain type of X-ray diffraction pattern. The preferred oxidants do not have as sharp X-ray diffraction reflection peaks as would be found, e.g., in a high crystalline material having the same chemical composition. Instead, the preferred oxidants of this invention exhibit reflection peaks which are relatively broad. The degree of sharpness of the reflection peak may be measured by the reflection peak band width at half heighth (w. h./2). In other words, the width of the reflection peak as measured at one-half of the distance to the top of the peak is the "band width at half heighth." The band width at half heighth is measured in units of °2 theta. Techniques for measuring the band widths are discussed, e.g., in chapter 9 of Klug and Alexander, X-ray Diffraction Procedures, John Wiley and Son, New York, 1954. The observed band widths at half heighth of the preferred catalysts of this invention are at least 0.16 °2 theta and normally will be at least 0.20 °2 theta.[1] For instance, excellent oxidants have been made with band widths at half heighth of at least 0.22 or 0.23 °2 theta. The particular reflection peak used to measure the band width at one-half heighth is the reflection peak having Miller (hkl) indices of 220. (See, e.g., chapter of Klug and Alexander, ibid.) Applicants do not wish to be limited to any theory of the invention in regard to the relationship between oxidant activity and band width. The preferred oxidants will have as the most intense X-ray diffraction peak a peak within the range of 2.49 to 2.55 and more preferably another peak of from 1.46 to 1.50. The preferred oxidants will have surfaces generally comprising X-ray diffraction reflection peaks at $d$ spacings within or about 4.80 to 4.86, 2.93 to 2.99, 2.49 to 2.55, 2.06 to 2.12, 1.68 to 1.73, 1.58 to 1.63 and 1.45 to 1.50 (with other peaks), with the most intense peak being between 2.49 to 2.55. Superior results have been obtained with oxidants having peaks between 4.81 to 4.85, 2.93 to 2.98, 2.50 to 2.54, 2.07 to 2.11, 1.69 to 1.72, 1.59 to 1.62 and 1.46 to 1.49, with the most intense peak being between 2.50 to 2.54. These ranges will generally be within the $d$-spacings of 4.81 to 4.85, 2.95 to 2.98, 2.52 to 2.54, 2.08 to 2.10, 1.70 to 1.72, 1.60 to 1.62 and 1.47 to 1.49, with the most intense peak being within the range of 2.50 to 2.54.

Magnesium ferrite formation may be accomplished by reacting an active compound of iron with an active compound of magnesium. By active compound is meant a compound which is reactive under the conditions to form the ferrite. Starting compounds of iron or magnesium may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, magnesium carbonate may be reacted with iron oxide hydrates to form magnesium ferrite. Desired ferrites may be obtained by conducting the reaction to form the ferrite at relatively low temperatures, that is, at temperatures lower than some of the very high temperatures used for the formation of some of the semi-conductor applications. Good results, e.g., have been obtained by heating the ingredients to a temperature high enough to produce the required ferrite but at conditions no more severe than equivalent to heating at 950° C. for 90 minutes in air.

The oxidants of this invention may also comprise additives. Phosphorus, silicon or mixtures thereof are examples of additives. Excellent results are obtained with phosphorus and/or silicon present in an amount of from or about 0.2 to 20 weight percent, based on the total weight of the atoms of iron and magnesium. These ingredients may contribute, e.g., to the stability of the oxidants. Excellent oxidants may contain less than 5 weight percent, and preferably less than 2 weight percent, of sodium or potassium in the surface of the oxidant. Other additives may be present. Also unreacted magnesium compounds may be present.

The silicon, phosphorus, or other additives may be added at various stages of the oxidant preparation. Silica may be incorporated in the oxidant, for example, by the acid hydrolysis of an organic or inorganic silicate, such as tetraethyl ortho silicate. The resulting hydrogel may be slurried with the other oxidant ingredients. Another method of preparation is to mix a silicate, ferrite or ferrite precursors in aqueous media whereby the silicate hydrolyzes in the presence of the other components of the oxidant. Similarly, if phosphorus is included in the oxidant, the phosphorus may be added in a variety of ways. One method is to mix the dry ingredients including the preformed ferrite, other than the phosphorus, with a phosphorus compound. Various phosphorus or silicon compounds may be employed such as any of the phosphoric acids, phosphorus pentoxide, ethyl phosphate, amine phosphate, ammonium phosphate, phosphorus halides, phosphorus oxyhalides, silicon halides and so forth, The phosphorus or silicon, if employed, should suitably be present in an intimate combination with the other ingredients of the oxidant. These additives may be combined chemically, intimately mixed, in solid solution with the other ingredients, and so forth.

The quantity of oxidant present during dehydrogenation will vary depending upon the type of process employed, the particular composition of the oxidant, whether carriers or supports are used, and so forth. With a moving bed the oxidant will generally be at least 10 parts per part by weight of the organic compound to be dehydrogenated and suitable ranges may be such as from 10 to 1500 parts of oxidant per part of organic compound to be dehydrogenated. Fresh oxidant may be added at any stage of the process including the addition during operation.

Carriers or supports for the oxidant may be employed such as alumina, pumice, silica and so forth. Diluents and binders may also be used. The oxidant will suitably be fine grained and the particle size of the oxidant may vary but for moving beds particle sizes of less than 1000 microns have given good results. Unless stated otherwise, the referred to compositions of the oxidants in this application are the main active constituents of the oxidants during dehydrogenation and any ratios and percentages refer to the surface of the oxidant in contact with the gaseous phase during dehydrogenation.

The oxidant may be reduced with a reducing gas, e.g., such as hydrogen or hydrocarbons. For example, the performed oxidant may be reduced with e.g. hydrogen at a temperature of at least 350° C. with the temperature of reduction generally being no greater than 850° C. The period of time for reduction will be dependent somewhat upon the temperature of reduction but ordinarily will be at least 30 minutes. By reducing gas is meant a gas that will react with oxygen of the oxidant under the conditions of reduction.

When employing the oxidant in this process excellent results have been obtained. For example, the oxidant exhibits relatively little time trend compared to other compositions. Further it has been found that the oxidant has desirable adsorption characteristics in regard to both oxygen, organic compounds and inert gases. The oxidant

---

[1] The powder diffraction patterns may be made, e.g. with a Norelco constant potential diffraction unit type No. 12215/0 equipped with a wide range goniometer type No. 42273/0, cobalt tube type No. 32119, proportional counter type No. 57250/1; all coupled to the Noreclo circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving .006 inch and scatter 1°. Strip chart recordings for identification are made with a scanning speed of ¼° per minute, time constant of 4 seconds and a full scale at 10³ counts per second. No correction is made for Ka doublet or instrumental broadening of the band widths.

selectively releases oxygen during dehydrogenation and is readily reoxidized during reoxidation. There is relatively limited carry-over of dehydrogenated organic compound on the oxidant after separation of the oxidant from the dehydrogenated gases and as a consequence, the use of a separate stripping step may, if desired, be eliminated and comparatively little or no stripping gas needs to be employed during reoxidation. Moreover, the oxidant is not sensitive to steam and steam may be advantageously employed during dehydrogenation such as in an amount of at least 2 mols per mol of organic compound to be dehydrogenated. A further advantage of the oxidant is that it is resistant to attrition and physical or chemical disintegration.

The process of this invention may be applied to the dehydrogenation of a variety of organic compounds having at least 2 carbon atoms to obtain the corresponding unsaturated derivative thereof. Such compounds normally will contain from 2 to 20 carbon atoms, at least one

grouping, a boiling point below about 350° C., and such compounds may contain other elements in addition to carbon and hydrogen such as oxygen, halogens, nitrogen and sulphur. Preferred are compounds having from 2 to 12 carbon atoms and especially preferred are compounds of 4 to 9 carbon atoms.

Among the types of organic compounds to be dehydrogenated to the corresponding unsaturated derivative by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustrative dehydrogenations include propionitrile to acrylonitrile, propionaldehyde to acrolein, ethyl chloride to vinyl chloride, methyl isobutyrate to methyl methacrylate, 2,3-dichlorobutane to chloroprene, ethyl pyridine to vinyl pyridine, ethylbenzene to styrene, isopropylbenzene to α-methyl styrene, ethyl-cyclohexane to styrene, cyclohexane to benzene, ethane to ethylene, propane to propylene, isobutane to isobutylene, n-butane to butene and butadiene-1,3, butene to butadiene-1,3, methyl butene to isoprene, cyclopentane to cyclopentene and cyclopentadiene-1,3, n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be applied to the formation of new carbon to carbon bonds by the removal of hydrogen atoms such as the formation of a carbocyclic compound from two aliphatic hydrocarbon compounds or the formation of a dicyclic compound from a monocyclic compound having an acyclic group. Examples of conversions are the conversion of n-heptane to toluene and propene to diallyl. Representative materials to be dehydrogenated by the process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 2,3 dichlorobutane, 1,3 dichlorobutane, 1,4 - dichlorobutane, the chlorofluoroethanes, methyl pentane, methylethyl ketone, n-butyl alcohol, methyl propionate, and the like. This invention is particularly adapted to the preparation of vinylidene compounds containing at least one $CH_2=C<$ group, that is, a group containing a terminal methylene group attached by a double bond to a carbon atom, and having 2 to 9 carbon atoms, preferably a hydrocarbon. Similarly, some acetylenic bonds may be produced.

The preferred fed to be dehydrogenated comprises hydrocarbons of 4 to 9 carbon atoms and particularly monoethylenically unsaturated hydrocarbons, with or without saturated hydrocarbons mixed therewith. Especially preferred are compositions having at least 50 mol percent of monoolefins having at least four contiguous non-quarternary carbon atoms such as n-butene-1, n-butene-2, n-pentene-1, n-pentene-2, 2-methylbutene-1, 2-methylbutene-2, 3-methylbutene-1, 2-methylpentene-1, hexene-1, hexene-2, ethyl benzene, cumene, cyclohexene, methyl cyclohexene and mixtures thereof. The preferred products are butadiene-1,3, styrene and isoprene. The process of this invention can provide a product wherein the principal product has the same number of carbon atoms as the corresponding feed.

Diluents or stripping agents such as nitrogen, helium, or other gases may be fed to the process at any point. Mixtures of diluents may be employed. Volatile compounds which are not dehydrogenated or which are dehydrogenated only to a limited extent may be present as diluents.

It is one of the advantages of this process that during dehydrogenation the reaction mixture may contain steam. When steam is employed during dehydration, the range will be between about 2 and 40 mols of steam per mol of organic compound to be dehydrogenated. Preferably, steam will be present in an amount from about 2 to 30 mols per mol of organic compound to be dehydrogenated and excellent results have been obtained within the range of about 3 to about 25 mols of steam per mol of organic compound to be dehydrogenated. The functions of the steam are several-fold, and the steam may act as more than a diluent. Diluents generally may be used in the same quantities as specified for the steam. Excellent results are obtained when the composition present in the reactor during dehydrogenation consists essentially of the organic compound to be dehydrogenated, diluents, and the oxidant as essentially the sole oxidizing agent.

The maximum temperature during the dehydrogenation generally will be at least about 250° C., such as greater than about 300° C. or 375° C., and the maximum temperature in the reactor may be about 650° C. or 750° C. or perhaps higher under certain circumstances. Suitable temperatures are within the range of or about 300° C. to 650° C., such as from or about 375° C. or 425° C. to about 600° C. or 650° C.

The total pressure during dehydrogenation may be atmospheric, superatmospheric or subatmospheric. However, relatively low total pressures are entirely suitable, such as equal to or less than 100 p.s.i.g. When the total pressure of the reaction gases during dehydration is one atmosphere or greater, the partial pressure of the organic compound to be dehydrogenated during dehydrogenation will desirably be no greater than one-third of the total pressure.

The contact time of the organic compound during dehydrogenation may be varied depending upon the particular process employed. However, we have discovered and it is an advantage of the invention that short contact times may be utilized such as less than 2 seconds and suitably less than one second such as from .005 to 0.9 second. For this definition the contact time is defined as the period beginning when the organic compound being dehydrogenated is first contacted with the oxidant in the dehydrogenation step and ending when separation of the gaseous reactants containing the dehydrogenated compound is initiated. Therefore, if a separator such as zone B of the drawing is employed, the period of time in the separator is not included in calculating contact time.

The reoxidation of the oxidant is accomplished by contacting the oxidant with an oxidizing gas at an elevated temperature. By an oxidizing gas is meant any gaseous composition that will supply oxygen to the oxidant under the conditions of reoxidation. Air, oxygen, steam and mixtures thereof, with or without diluents, and so forth, may be employed. Generally the amount of oxygen, from any source, supplied during reoxidation will be from .1 to 1.2 mols per mol of $H_2$ removed during the dehydrogenation step. As mentioned above, it is one advantage of this invention that there is relatively little gas to be stripped from the oxidant after the reaction gases have been separated from the oxidant. Consequently, good stripping has been obtained with, e.g., 5 or less mols of stripping gas such as steam per mol of organic compound to be dehydrogenated and in some instances the stripping step may be eliminated. At any rate, it is possible to conduct any stripping during the reoxidation step without conducting a separate stripping step. The reoxidation can be conducted, e.g., at temperatures within the same ranges recited for the dehydrogenation step but somewhat higher temperatures may be employed in some instances. Good results have been obtained at contact times of less than 10 seconds, preferably less than 5 seconds. Pressures of less than 100 p.s.i.g. are generally employed.

In the following examples will be found specific embodiments of the invention and details employed in the practice of the invention. Percent conversion refers to the mols of organic compound to be dehydrogenated that is consumed, based on the mols of the said organic compound fed to the reactor, percent selectivity refers to the mols of product formed based on the mols of the said organic compound consumed, and percent yield refers to the mols of product formed based on the mols of the said organic compound fed. All other percentages are by weight unless expressed otherwise.

Example 1

To illustrate an example of a preferred method of conducting the invention, reference is again made to the drawing. The invention is illustrated by the dehydrogenation of n-butene to butadiene-1,3. The reactor is constructed of 316 stainless steel with dehydrogenation zone A being a dilute phase riser reactor which is 40 inches long and is ⅝ inch O.D. tubing. In this example, butene, oxidant and steam are fed to the bottom of the riser reactor zone A through a ¼ inch O.D. tube. This riser zone A discharges into a 6 inch diameter disengaging separator which is zone B of the drawing wherein the gaseous dehydrogenated product is separated by passing through a pair of micrometallic filters which are alternately on stream or being cleaned by nitrogen blowback. The oxidant which is diminished in oxygen content in the dehydrogenation zone A and which has been separated from the gaseous product in separator zone B then falls into a standpipe, not illustrated in the drawing. The standpipe is 30 inches long and is standard 1½ inch diameter I.D. stainless steel pipe. From the standpipe the oxidant is conducted through a reoxidation zone which is illustrated as zone C of the drawing. The reoxidation zone is ⅝ inch O.D. tubing 40 inches long with air and steam being fed through a ¼ inch tube into the bottom of the reoxidation zone. The air and steam serve to convey the oxidant through the reoxidation zone as well as to reoxidize the oxidant. The reoxidized oxidant discharges into separator zone D of the drawing. The separator is a 6 inch diameter section where the waste gases such as nitrogen and combustion gases are taken off through two micrometallic filters. The reoxidized oxidant drops by gravity into a standpipe, not shown in the drawing. This standpipe is 30 inches long and is constructed of 1½ inch O.D. stainless steel pipe. The cycle is completed by allowing the reoxidized oxidant to be fed by gravity through a narrow neck into the entrance to the riser reactor dehydrogenation zone A described above where it contacts fresh n-butene, oxidant and steam. The contact time in dehydrogenation zone A is about 0.1 second and the contact time in reoxidation zone B is about 0.1 second. Temperatures are measured by thermocouple and the maximum temperature in the dehydrogenation zone A is 540° C. and the maximum temperature in the reoxidation zone is 600° C. The feed to dehydrogenation zone A consists of a hydrocarbon mixture containing by mol percent 98 percent n-butenes-2, 1.0 percent n-butene-1, 0.5 percent n-butane and 0.5 percent butadiene. Steam is fed to dehydrogenation zone A in an amount of 3.5 mols per mol of the total hydrocarbon feed. Oxygen is supplied as air to the reoxidation zone C in an amount equivalent to 0.65 mol oxygen per mol of hydrocarbon feed. The reoxidized oxidant is fed to dehydrogenation zone A in an amount of 200 parts by weight per weight of hydrocarbon fed to zone A. The oxidant employed comprises particles of 40 to 60 mesh size (Tyler screen) magnesium ferrite and iron oxide. No carrier or support is used for the oxidant. The oxidant is prepared by intimately mixing 201 parts by weight of alpha iron oxide $Fe_2O_3 \cdot H_2O$ per 100 parts by weight of magnesium carbonate with 2 percent by weight of $MgCl_2$ based on the total weight of $Fe_2O_3 \cdot H_2O$ and magnesium carbonate. The mixture is then heated in air at 890° C. for a period of time selected to cause the formation of the oxidant having 10 percent by weight of alpha iron oxide. This analysis is made by X-ray diffraction.[2] The oxidant is then reduced with hydrogen at a temperature of 510° C. for two hours. After heating the oxidant is screened to select the 40 to 60 mesh size used. The oxidant has the most intense X-ray diffraction peak at about 2.53 d-spacing and comprises X-ray diffraction peaks at 4.82, 2.96, 2.09, 1.71, 1.61 and 1.48 with other minor peaks. The band width at half heighth of the peak at hkl 220 is about .25° 2 theta.

Example 2

The procedure of Example 1 is repeated with the exceptions that the hydrocarbon fed consists of approximately 50 mol percent n-butane and 49 mol percent n-butene-2 with the remainder being essentially butadiene-1,3 and n-butene-1 and that halogen is fed to the dehydrogenation zone. The halogen consists of an aqueous mixture of ammonium chloride and ammonium bromide in an amount equivalent to .03 mol of ammonium chloride and .011 mol of ammonium bromide (calculated as mols of $Cl_2$ and $Br_2$ respectively) per mol of hydrocarbon. The ammonium halide is recovered and recycled to the dehydrogenation zone. The aqueous ammonium halide solution is vaporized and fed with the steam to the dehydrogenation zone.

Example 3

The procedure of Example 1 is repeated with an oxidant which comprises in addition to magnesium ferrite and iron oxide, 4 percent by weight of stabilizers including phosphorus which is incorporated as phosphoric acid in the preformed ferrite. The temperature in the dehydrogenation zone is about 500° C. Butene-2 is dehydrogenated to butadiene-1,3 with the yield after 400 hours of operation being about 66 mol percent per pass of butadiene.

Example 4

The procedure of Example 3 is repeated for the dehydrogenation of 2 methyl butene-2 to isoprene. The oxidant employed is that of Example 3 and after 500 total hours on stream the yield of isoprene is 55 mol percent per pass at a dehydrogenation zone temperature of about 460° C.

Example 5

The procedure of Example 1 is repeated with an oxidant which comprises magnesium ferrite and $H_3PO_4$ in an amount of 8 percent by weight of $H_3PO_4$ (added as aqueous solution but calculated as $H_3PO_4$) based on the total oxidant weight. Both isoprene and butadiene are separately produced with the oxidant and after 500 hours of use the oxidant produced about 65 mol percent butadiene per pass from n-butene as a dehydrogenation zone temperature of about 490° C.

Example 6

Ethyl benzene is dehydrogenated to styrene according

---

[2] See Footnote 1 for X-ray procedure.

to the general procedure of Example 1 using the oxidant of Example 1 with the temperatures and flow rates being adjusted for optimum yield of styrene.

Example 7

The reactor is constructed of 316 stainless steel with the dehydrogenation zone being a dilute phase riser reactor which is 40 inches long and is 5/8 inch O.D. tubing. In this example air, steam and oxidant are fed to the bottom of the riser reactor through a 1/4 inch O.D. tube. N-Butene is fed into the riser reactor at a point about midway up the tube and at this point the dehydrogenation zone begins. The riser reactor discharges into a 6 inch diameter disengaging separator wherein the gaseous products are separated by passing through a pair of micrometallic filters which are alternately on stream or being cleaned by nitrogen blowback. The oxidant which is diminished in oxygen content then falls into a standpipe which is 30 inches long and which is constructed of standard 1½ inch I.D. stainless steel pipe. From the standpipe the oxidant is fed through a narrow neck into the entrance to the riser reactor where it is reoxidized by contacting air and steam. The total residence time in the riser reactor zone is about 0.1 second (including both the oxidizing and dehydrogenation portion). Temperatures are measured by thermocouple and the maximum temperature in the riser reaction zone is 550° C. The hydrocarbon that is fed to the reaction zone is composed of 98 mol percent n-butene. The steam is fed to the riser in an amount of 7.5 mols per mol of the total hydrocarbon fed. The oxygen is supplied as air to the bottom of the riser reactor in an amount equivalent to about .70 mol of oxygen per mol of hydrocarbon. The oxidant is fed to the reactor in an amount of about 250 parts by weight per weight hydrocarbon. The oxidant employed is the same as described in Example 1 above.

Example 8

The procedure of Example 7 is repeated with an oxidant having 3 percent by weight $H_3PO_4$ added to the oxidant after ferrite formation. Butene-2 is dehydrogenated to butadiene-1,3 with the yield after 125 hours of operation being about 60.5 mol percent per pass of butadiene.

We claim:

1. A process for the oxidative dehydrogenation of organic compounds having from 2 to 12 carbon atoms and at least

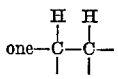

grouping which comprises (1) contacting in a dehydrogenation step the said organic compound in gaseous form with an oxidant at an elevated temperature with the said oxidant supplying oxygen in the dehydrogenation step to react with hydrogen from the said organic compound and thereby produce dehydrogenated organic compound and oxidant which is diminished in oxygen, (2) separating the dehydrogenated organic compound from the oxidant which is diminished in oxygen, (3) reoxidizing the oxidant and (4) contacting organic compound to be dehydrogenated with the reoxidized oxidant, the said oxidant comprising magnesium ferrite.

2. The process of claim 1 wherein the said organic compound is a hydrocarbon.

3. The process of claim 1 wherein the said oxidant is introduced into the dehydrogenation zone as a fluidized bed in a higher state of oxidation and thereafter is introduced as a fluidized bed into a reoxidizing zone wherein the oxidant is regenerated by heating it in the presence of an oxidizing gas and returning the resulting oxidized oxidant to the dehydrogenation zone.

4. A process for the continuous oxidative dehydrogenation of organic compounds to produce a member selected from the group consisting of butadiene-1,3, styrene or isoprene which comprises in a continuous process (1) contacting in an oxidative dehydrogenation step the corresponding organic compound selected from the group consisting of n-butene, methyl butene and ethyl benzene in gaseous form with a moving fluidized bed oxidant at an elevated temperature of greater than about 300° C. with the said moving fluidized bed oxidant supplying oxygen in the dehydrogenation step to react with hydrogen from the said organic compound and thereby produce dehydrogenated organic compound and moving fluidized bed oxidant which is diminished in oxygen, (2) separating the dehydrogenated organic compound from the moving fluidized bed oxidant which is diminished in oxygen, (3) reoxidizing the moving fluidized bed oxidant which has had the organic compound separated therefrom and (4) contacting organic compound to be dehydrogenated with the reoxidized moving fluidized bed oxidant, the said moving fluidized bed oxidant comprising magnesium ferrite, with at least 65 atomic weight percent of the magnesium being present in the oxidant as the ferrite.

5. The process of claim 4 wherein the oxidant comprises magnesium ferrite and iron oxide with from 10 to 98 atomic weight percent of the iron being present as magnesium ferrite and from 90 to 2 atomic weight percent of the iron being present as iron oxide.

6. The process of claim 5 wherein the said iron which is present as iron oxide in the oxidant is predominately present during the formation of the said ferrite.

7. The process of claim 4 wherein the said organic compound is an acyclic hydrocarbon of 4 to 5 carbon atoms having a straight chain of at least 4 carbon atoms.

8. The process of claim 4 wherein the said organic compound is methyl butene.

9. The process of claim 4 wherein the said organic compound is n-butene.

10. The process of claim 4 wherein the contact time of the organic compound in the dehydrogenation step is from .005 to 0.9 second.

11. The process of claim 4 wherein at least two mols of steam are added to the dehydrogenation step per mol of said organic compound.

12. The process of claim 4 wherein the oxidant has X-ray diffraction peaks at $d$-spacings within 4.80 to 4.86, 2.93 to 2.99, 2.49 to 2.55, 2.06 to 2.12, 1.68 to 1.73, 1.58 to 1.63 and 1.45 to 1.50, with the band width at half height of the peak at Miller indices of 220 being at least 0.16° 2 theta.

13. The process of claim 4 wherein the oxidant has the most intense X-ray diffraction peak within the range of 2.50 to 2.54.

14. The process of claim 4 wherein the said iron of the oxidant is present from 40 to 95 atomic percent as a ferrite and from 60 to 5 atomic weight percent as iron oxide during the dehydrogenation step.

15. The process of claim 4 wherein the said iron oxide of the oxidant is predominantly present as gamma iron oxide during the dehydrogenation step.

16. The process of claim 4 wherein the oxidant contains phosphorus in an amount from 0.2 to 20 weight percent based on the total weight of the atoms of iron and magnesium.

17. The process of claim 4 wherein magnesium of the oxidant surface is present in an amount from about 3 to 30 weight percent of the total of iron and magnesium atoms.

18. The process of claim 4 wherein in the dehydrogenation zone the temperature is from 425° C. to 650° C. and the total pressure is less than 100 p.s.i.g. and in the regeneration zone the temperature is no greater than 750° C.

19. The process of claim 4 wherein the said oxidant has been prepared by heating under conditions no more severe than equivalent to heating at 950° C. for 90 minutes in the presence of air.

20. The process of claim 4 wherein there is substantially no steam added during the reoxidation of the oxidant.

21. The process of claim 4 wherein the iron of the oxidant during oxidative dehydrogenation predominately has the valence of plus 3 and is in a cubic face-centered structure.

22. The process according to claim 4 wherein the quantity of oxidant present during dehydrogenation is at least 10 parts by weight per part of said organic compound.

23. A process for the oxidative dehydrogenation of a hydrocarbon selected from the group consisting of n-butene, methyl butene and mixtures thereof which comprises continuously contacting in a dehydrogenation zone the hydrocarbon and from 2 to 15 mols of steam per mol of hydrocarbon with a dilute phase moving fluidized bed oxidant, with the said oxidant supplying oxygen in the dehydrogenation zone to react with hydrogen from the hydrocarbon and thereby produce dehydrogenated hydrocarbon having the same number of carbon atoms, in the dehydrogenation zone the temperature being from 425° C. to 600° C. and the contact time for the hydrocarbons being less than 0.9 second, separating the dehydrogenated hydrocarbon from the oxidant and passing the oxidant as a dilute phase moving fluidized bed to a reoxidation zone wherein the oxidant is reoxidized by contacting with an oxidizing gas at a temperature of no greater than 750° C. and the reoxidized oxidant is conducted to the said dehydrogenation zone as a dilute phase moving fluidized bed to again supply oxygen for dehydrogenating hydrocarbon, the said oxidant as it enters the dehydrogenation zone comprising magnesium ferrite and gamma iron oxide with the iron in the oxidant being present from 40 to 95 atomic weight percent as magnesium ferrite and from 60 to 5 atomic weight percent as iron oxide and the said oxidant having a surface with X-ray diffraction peaks at $d$-spacings within 4.81 to 4.85, 2.95 to 2.98, 2.52 to 2.54, 2.08 to 2.10, 1.70 to 1.72, 1.60 to 1.62 and 1.47 to 1.49, with the band width at half heighth as measured in units of ° 2 theta being at least 0.20.

References Cited

UNITED STATES PATENTS

| | | | |
|---|---|---|---|
| 2,387,524 | 10/1945 | Meinert | 260—680 |
| 2,957,928 | 10/1960 | Cahn | 260—680 |
| 2,978,522 | 4/1961 | Cahn | 260—680 |
| 3,050,572 | 8/1962 | Masterton et al. | 260—680 |
| 3,118,007 | 1/1964 | Kronig et al. | 260—680 |
| 3,270,080 | 8/1966 | Christmann. | |
| 3,284,536 | 11/1966 | Bajars et al. | |

PAUL M. COUGHLAN, JR., *Primary Examiner.*

U.S. Cl. X.R.

260—683.3, 696, 669